Sept. 15, 1936.   L. NELSON   2,054,708
PIE PLATE LIFTER
Filed Feb. 5, 1935
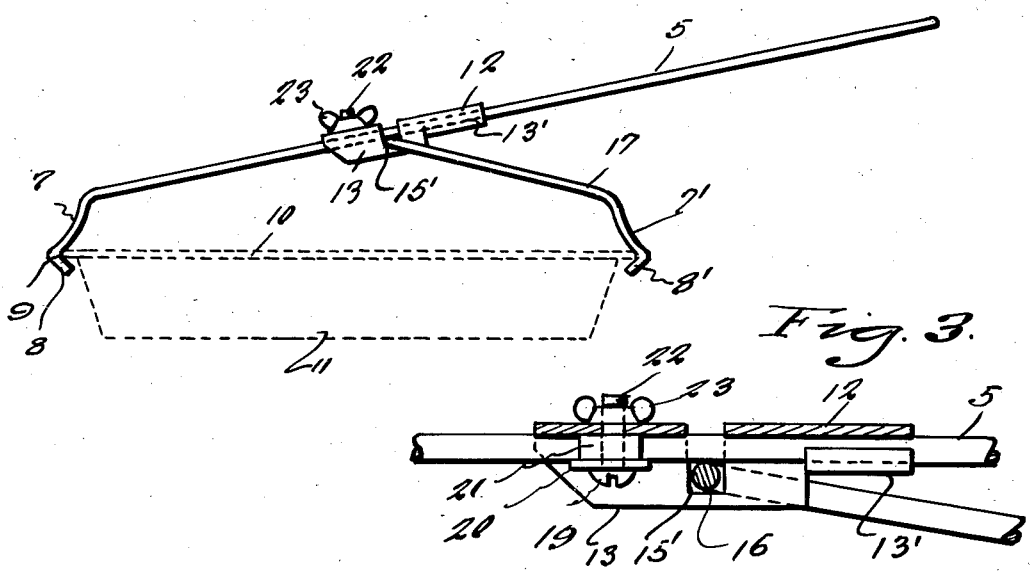
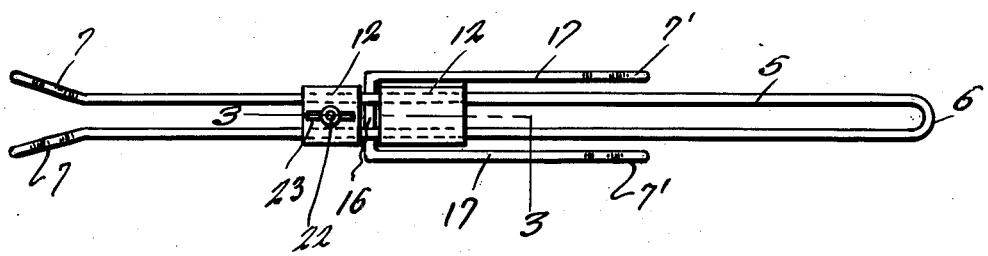
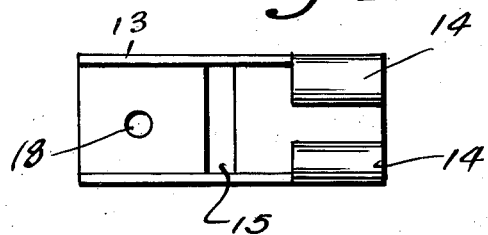
Inventor
Leon Nelson
By Clarence A. O'Brien
Attorney Patented Sept. 15, 1936

2,054,708

UNITED STATES PATENT OFFICE 2,054,708

PIE PLATE LIFTER

Leon Nelson, Fords, N. J.

Application February 5, 1935, Serial No. 5,131

3 Claims. (Cl. 294—34)

This invention relates to culinary implements, and more particularly to plate and pan lifters.

The principal object of my invention is to provide a device of this character which is simple in construction and effective in lifting heated plates and pans from place to place.

Another object is to provide a lifter which is adjustable to accommodate various sizes of plates and pans.

Other objects will be apparent from the following description of the invention, taken in connection with the accompanying drawing, wherein:—

Figure 1 is a side elevational view of the lifter engaged with a plate.

Figure 2 is a top plan view of the device.

Figure 3 is a sectional view taken on line 3—3 of Figure 2, and

Figure 4 is a bottom plan view of the slide comprising the adjusting means.

In the drawing, wherein for the purpose of illustration is shown a preferred embodiment of my invention, 5 designates a handle which is U-shaped in configuration, to form at one end thereof, a loop 6 for suspending the lifter from a nail, hook or the like. The end of the handle opposite the loop 6 is provided with a pair of arms 7, which depend angularly from the handle and terminate in inturned fingers 8. Each arm 7 is curved inwardly to form an acute recess 9, into which the rim 10 of a plate or pan 11 is adapted to snugly fit. It is apparent from this construction of the arms 7 that they bear against the upper part of the rim 10 and thereby assist the inturned fingers 8 to grip the plate or pan 11.

Slidably mounted on the bifurcated handle 5 is a slide 12 with depending sides 13 and 13'. The sides 13 contact the outer sides of the handle, while the sides 13' are each bent inwardly to form guides 14, whereby each leg of the bifurcated handle is movably secured to the slide.

The mid-section of the slide 12 is broken away to form an opening 15, which extends into the depending sides 13, thereby forming an opening 15' in the depending sides 13 for the reception of the cross-bar 16, which integrally joins the members 17. These members have their ends constructed with curved arms 7' and fingers 8', identical in construction with the arms 7 and fingers 8, to form gripping members for the pan 11. It is thus evident that by operating the slide 12, the members 17 may be moved to adjust the fingers 8 and 8' to accommodate various sizes of pans or plates.

In order to secure the slide 12 in place on the handle 5, the slide is provided with an aperture 18, midway between the sides 13, for the reception of a bolt 19. The underside of the head of the bolt bears against the washer 20, which contacts the legs of the handle 5. Intermediate the legs of the handle and bearing directly against the washer, is a nut 21, which is threaded on the stem 22 of the bolt. The threaded stem 22 of the bolt receives the wing nut 23, which is screwed thereon to hold the slide in fixed position.

In operation, a portion of the rim 10 of the pan 11 is fitted in the recess 9 formed by the arms 7 and fingers 8; the slide 12 is then moved along the handle 5 until the recess 9, formed by the arms 7 and fingers 8, grip that portion of the rim opposite to that held in the recess. The wing nut 23 is then threaded on the bolt to secure the lifter in its adjusted position. The pan or plate may then be lifted by grasping the handle 5, and thus eliminating the necessity of the hands of the operator coming in contact with the pan or plate.

It is to be understood that various changes may be made in my invention, especially in details of construction, proportion and arrangement of parts, within the scope of the appended claims.

What is claimed is:—

1. A pan lifter of the class described comprising a bifurcated handle, gripping fingers forming the terminals thereof, a slide carried by said handle and comprising a flat surface with depending sides, said sides being split to permit portions thereof to grip the underside of the handle and to permit the remaining portions to extend below the handle and to be partly broken away to form openings therein, and opposed gripping means adapted to be received by said openings.

2. A pan lifter of the class described comprising a bifurcated handle, gripping fingers forming the terminals thereof, a slide carried by said handle and comprising a flat surface with depending sides, said sides being split to permit portions thereof to grip the under sides of the handle and to permit the remaining portions to extend below the handle and to be partly broken away to form openings therein, opposed gripping means adapted to be received by said openings, and means for adjustably retaining the slide in fixed position, said means comprising a longitudinally adjustable threaded screw, a washer, a wing nut, and a spacing nut positioned between the legs of the handle and above the washer.

3. A pan lifter of the class described comprising a bifurcated handle, gripping fingers forming the terminals thereof, a slide carried by said handle and comprising a flat surface of substantial length with depending sides along its longitudinal edges, said sides abutting the outer portions of the handle to form a guide for the slide, said slide having its mid section broken away to form an opening which extends into the depending sides, and opposed gripping means adapted to be received by said opening in the slide.

LEON NELSON.